US012519786B2

United States Patent
Chen et al.

(10) Patent No.: US 12,519,786 B2
(45) Date of Patent: Jan. 6, 2026

(54) MODEL TRAINING METHOD, CENTRAL NODE DEVICE, AND COMPUTER PROGRAM PRODUCT

(71) Applicant: Dell Products L.P., Round Rock, TX (US)

(72) Inventors: Tianxiang Chen, Shanghai (CN); Jinpeng Liu, Shanghai (CN); Zijia Wang, London (GB); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 92 days.

(21) Appl. No.: 18/589,547

(22) Filed: Feb. 28, 2024

(65) Prior Publication Data
US 2025/0247389 A1    Jul. 31, 2025

(30) Foreign Application Priority Data
Jan. 26, 2024    (CN) .......................... 202410111584.3

(51) Int. Cl.
*H04L 9/40* (2022.01)
(52) U.S. Cl.
CPC ...... *H04L 63/0876* (2013.01); *H04L 63/0435* (2013.01)
(58) Field of Classification Search
CPC .................. H04L 63/0876; H04L 63/0435
See application file for complete search history.

(56) References Cited

U.S. PATENT DOCUMENTS

| 2020/0145419 A1* | 5/2020 | Yitbarek ............. H04L 63/0853 |
| 2022/0200985 A1* | 6/2022 | Simon ................ H04L 63/0853 |
| 2022/0405383 A1 | 12/2022 | Liu et al. |
| 2023/0068880 A1 | 3/2023 | Liu et al. |

(Continued)

OTHER PUBLICATIONS

D. Stutz, "Implementing Tensorflow Operations in C++—Including Gradients," https://davidstutz.de/implementing-tensorflow-operations-in-c-including-gradients/, Feb. 4, 2017, 14 pages.

(Continued)

*Primary Examiner* — Khoi V Le
(74) *Attorney, Agent, or Firm* — Ryan, Mason & Lewis, LLP

(57) ABSTRACT

A method in one embodiment comprises: communicating, in response to receiving configuration information, with a remote attestation device to attest a trusted execution environment (TEE) of a central node device, the configuration information including a division manner for training sample data for model training; establishing a secure channel with one or more edge node devices in response to passing the attestation for the TEE, wherein the one or more edge node devices each have a TEE; and performing the following operations iteratively until a predetermined condition is satisfied: selecting, from the one or more edge node devices, at least one edge node device for training a model; updating a global model parameter based on a training result received over the secure channel from the selected at least one edge node device; and sending, to the one or more edge node devices, the updated global model parameter over the secure channel.

20 Claims, 7 Drawing Sheets

(56) References Cited

U.S. PATENT DOCUMENTS

2023/0396434 A1    12/2023   Liu et al.
2024/0143765 A1*   5/2024    Jungerman .......... H04L 9/3242

OTHER PUBLICATIONS

Github, Inc. "Create an op," https://github.com/tensorflow/docs/blob/master/site/en/guide/create_op.md, Jul. 16, 2020, 30 pages.
Microsoft, "Microsoft SEAL," https://www.microsoft.com/en-us/research/project/microsoft-seal/, 2021, 4 pages.
Fate, "An Industrial Grade Federated Learning Framework," https://fate.fedai.org/, 2021, 5 pages.
Github, Inc. "Deep Learning with Intel SGX," https://github.com/landoxy/intel-sgx-deep-learning, Jan. 21, 2019, 4 pages.
Intel Corporation, "Intel® SGX SDK Developer Reference for Windows," Mar. 10, 2020, 461 pages.
Wikipedia, "Software Guard Extensions," https://en.wikipedia.org/w/index.php?title=Software_Guard_Extensions&oldid=1028673056, Jun. 15, 2021, 5 pages.
Wikipedia, "Trusted Execution Environment," https://en.wikipedia.org/w/index.php?title=Trusted_execution_environment&oldid=1027841774, Jun. 10, 2021, 7 pages.
Wikipedia, "Trusted Computing Base," https://en.wikipedia.org/wiki/Trusted_computing_base, Jan. 13, 2021, 4 pages.
Github, "Open Enclave SDK," https://openenclave.io/sdk/, Accessed Apr. 21, 2022, 3 pages.
Github, "Asylo," https://github.com/google/asylo, Accessed Apr. 21, 2022, 8 pages.
Wikipedia, "Call Stack," https://en.wikipedia.org/wiki/Call_stack, Mar. 22, 2022, 8 pages.
Wikipedia, "Homomorphic Encryption," https://en.wikipedia.org/wiki/Homomorphic_encryption, May 2, 2022, 12 pages.
Github, "FederatedAI/FATE," https://github.com/FederatedAI/FATE, Accessed Decmeber 26, 2023, 4 pages.
U.S. Appl. No. 17/966,313 filed in the name of Tianxiang Chen et al., filed Oct. 14, 2022, and entitled "Method, Device, and Computer Program Product for Executing Computer Programs."
U.S. Appl. No. 18/108,931 filed in the name of Tianxiang Chen et al., filed Feb. 13, 2023, and entitled "Method, Device, and Computer Program Product for Generating Neural Network Model."

* cited by examiner

MODEL TRAINING METHOD, CENTRAL NODE DEVICE, AND COMPUTER PROGRAM PRODUCT

RELATED APPLICATION

The present application claims priority to Chinese Patent Application No. 202410111584.3, filed Jan. 26, 2024, and entitled "Model Training Method, Central Node Device, and Computer Program Product," which is incorporated by reference herein in its entirety.

FIELD

Embodiments of the present disclosure relate to the field of computer processing and, more specifically, to a federated learning-based model training method, a central node device, and a computer program product.

BACKGROUND

With the ongoing development of the computer technology, more and more artificial intelligence technologies are emerging and have been widely used. At the same time, the privacy and security of data have become more and more important and are given more and more attention. As a type of machine learning technique, federated learning allows a group of organizations or groups within the same organization to perform training and improve a shared global machine learning model in a collaborative and iterative manner. Federated learning allows members of a group to build a common, powerful machine learning model without sharing data, which can address key problems such as data privacy, data security, data access permissions, and heterogeneous data access. Currently, federated learning has been widely used in many industries, including telecommunications, Internet of Things (IOT), and the like, by virtue of its security protection for data privacy and mechanism of joint modeling.

SUMMARY

Embodiments of the present disclosure provide a federated learning-based model training method, a central node device, and a computer program product.

According to a first aspect of the present disclosure, a federated learning-based model training method is provided, which is executed by a central node device having a Trusted Execution Environment (TEE). The method includes: communicating, in response to receiving configuration information, with a remote attestation device to attest the TEE of the central node device, the configuration information including a division manner for training sample data for model training; establishing a secure channel with one or more edge node devices in response to passing the attestation for the TEE, wherein the one or more edge node devices each have a TEE; and performing the following operations iteratively until a predetermined condition is satisfied: selecting, from the one or more edge node devices, at least one edge node device for training a model; updating a global model parameter based on a training result received over the secure channel from the selected at least one edge node device, wherein the selected at least one edge node device trains corresponding models separately according to the division manner, and the training result corresponds to the division manner; and sending, to the one or more edge node devices, the updated global model parameter over the secure channel.

According to a second aspect of the present disclosure, a central node device having a TEE is provided, the central node device including: at least one processor; and a memory coupled to the at least one processor and having instructions stored therein, wherein the instructions, when executed by the at least one processor, cause the central node device to perform actions including: communicating, in response to receiving configuration information, with a remote attestation device to attest the TEE of the central node device, the configuration information including a division manner for training sample data for model training; establishing a secure channel with one or more edge node devices in response to passing the attestation for the TEE, wherein the one or more edge node devices each have a TEE; and performing the following operations iteratively until a predetermined condition is satisfied: selecting, from the one or more edge node devices, at least one edge node device for training a model; updating a global model parameter based on a training result received over the secure channel from the selected at least one edge node device, wherein the selected at least one edge node device trains corresponding models separately according to the division manner, and the training result corresponds to the division manner; and sending, to the one or more edge node devices, the updated global model parameter over the secure channel.

According to a third aspect of the present disclosure, a computer program product is provided. The computer program product is tangibly stored on a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By additional description of exemplary embodiments of the present disclosure, provided herein with reference to the accompanying drawings, the above and other objectives, features, and advantages of the present disclosure will become more apparent, wherein identical reference numerals generally represent identical components in the exemplary embodiments of the present disclosure, and in which.

In various accompanying drawings, identical or corresponding reference numerals represent identical or corresponding parts.

DETAILED DESCRIPTION

Figure 1:
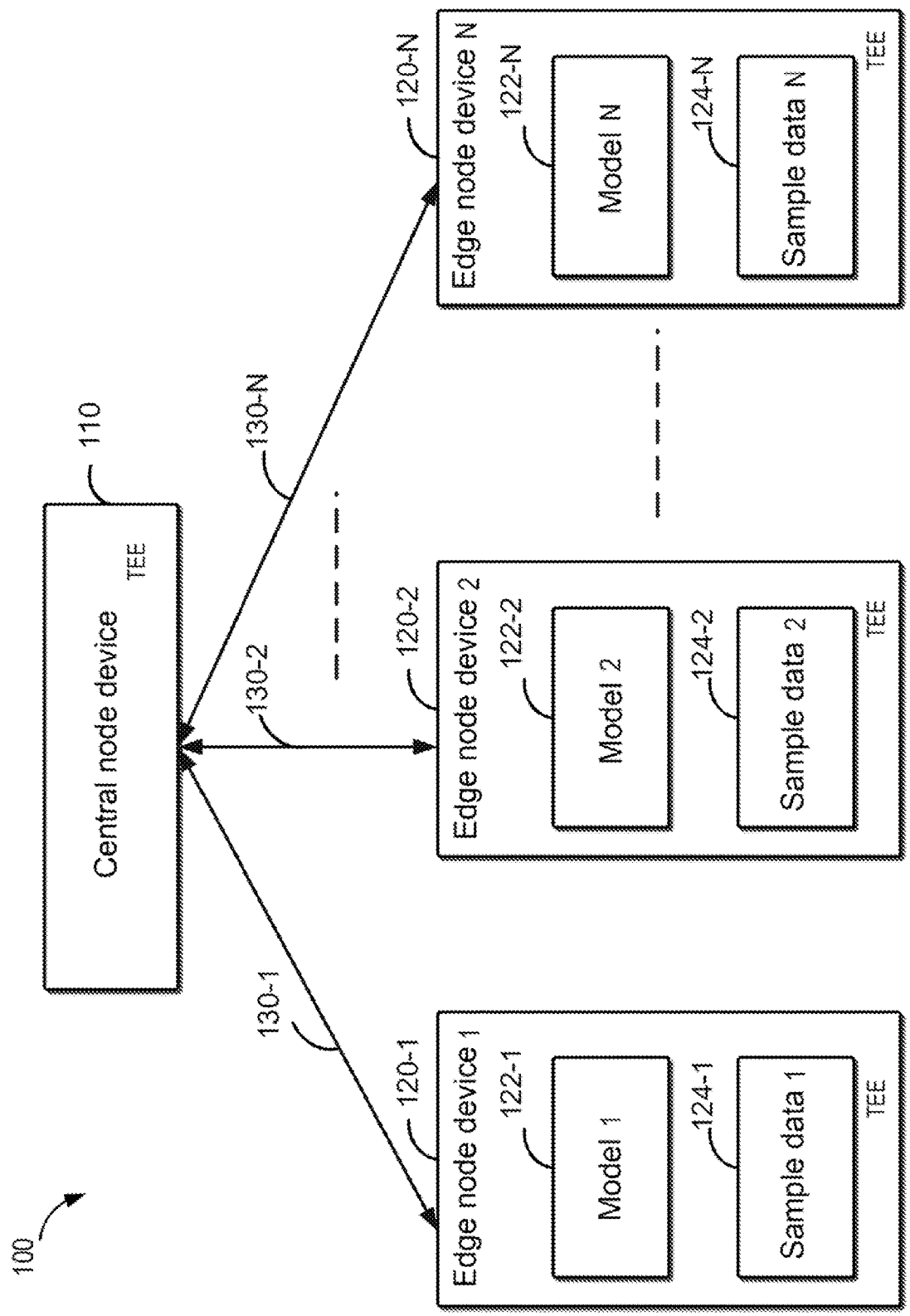
FIG. 1 is a block diagram of an example system in which embodiments of the present disclosure can be implemented.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

A conventional machine learning process collects data from various devices and aggregates the collected data to a central server to train various types of models such as neural network models. However, this method inevitably includes data transmission between various devices and the central server, which limits the ability of the model to learn in real time. In addition, since very often, data is sensitive, collecting data across different devices to a central server for any purpose inevitably raises data security and privacy concerns.

In contrast, federated learning, as a type of machine learning technique, is a method that uses local data to train and update models at local devices. The local devices then send these locally trained models or parameters of the models from the local devices to a central server. The central server performs an aggregation (e.g., averaging weights, or the like) operation on a plurality of models or model parameters received from a plurality of local devices, and then sends the merged and improved global model or global model parameter back to all of the local devices in order to update the local models by the local devices.

Federated learning has been widely used in many industries by virtue of its security protection for data privacy and mechanism of joint modeling. For the protection of data security and privacy of each participant, it is currently typically achieved using homomorphic encryption or secret-shared multi-party computation in the security protocol layer used in open source federated learning.

For example, in industrial applications, there are both Central Processing Unit (CPU)-based homomorphic encryption and Graphics Processing Unit (GPU)-based accelerated homomorphic encryption. However, these solutions usually result in very heavy computational loads and long latencies, which result in computational and training inefficiencies. For secret sharing methods, network traffic can be very busy because the methods generate a large number of network packets. For these reasons, the current federated learning methods actually serve security at the cost of performance and remain difficult to deploy in large-scale production environments. Furthermore, for homomorphic encryption or secret sharing, such techniques were originally designed for computation between two participants. When the number of involved participants increases, these solutions do not scale well, and the performance degrades dramatically. Therefore, it is desired to provide a federated learning-based model training method that can reduce the computational load, reduce the network load, and increase the training efficiency.

Accordingly, at least to address the above problems and other potential problems, embodiments of the present disclosure provide a federated learning-based model training method, which is executed by a central node device having a Trusted Execution Environment (TEE). The method includes: communicating, in response to receiving configuration information, with a remote attestation device to attest the TEE of the central node device, the configuration information including a division manner for training sample data for model training; establishing a secure channel with one or more edge node devices in response to passing the attestation for the TEE, wherein the one or more edge node devices each have a TEE; and performing the following operations iteratively until a predetermined condition is satisfied: selecting, from the one or more edge node devices, at least one edge node device for training a model; updating a global model parameter based on a training result received over the secure channel from the selected at least one edge node device, wherein the selected at least one edge node device trains corresponding models separately according to the division manner, and the training result corresponds to the division manner; and sending, to the one or more edge node devices, the updated global model parameter over the secure channel.

The federated learning-based model training method and system according to embodiments of the present disclosure, by utilizing a TEE, realize a novel federated learning-based architecture for implementing training of models. The federated learning-based model training method according to embodiments of the present disclosure is independent of the security protocol layer in current standard federated learning implementations, but instead takes full advantage of the data protection mechanism in the TEE, and can perform plaintext computations in a secure environment, thereby enabling the efficiency of model training to be improved while significantly conserving computational resources and reducing the computational load.

Embodiments of the present disclosure will be further described in detail below with reference to the accompanying drawings. FIG. 1 is a block diagram of an example system 100 in which embodiments of the present disclosure can be implemented.

The example system 100 can implement a federated learning-based model training method according to embodiments of the present disclosure. The example system 100 includes a central node device 110 and one or more edge node devices 120-1, 120-2, . . . , and 120-N, where N is a positive integer greater than or equal to 1. Each edge node device 120-$i$ ($1 \leq i \leq N$) may include a corresponding model 122-$i$ and sample data 124-$i$ for training the model 122-$i$.

The central node device 110 and the one or more edge node devices 120-1, 120-2, . . . , and 120-N can implement training for the global model by iteratively training the corresponding models. In each iterative operation, the central node device 110 may select, from the one or more edge node devices 120-1, 120-2, . . . , and 120-N, at least one edge node device 120-$s$ ($1 \leq s \leq t$; t is the number of edge node devices selected during the current iterative operation for training the model) to train the corresponding model. Accordingly, the selected edge node device 120-$s$ may train the corresponding model 122-*s* using the respective sample data 124-*s* thereof and may send the training result to the central node device 110. In each iterative operation, the central node device 110 processes the received training result to obtain an updated global model parameter. The central node device 110 may further send the updated global model parameter to each edge node device 120-*i* of the edge node devices 120-1, 120-2, . . . , and 120-N. Each edge node device 120-*i* may update the parameters of the local model based on the received global model parameter, thereby obtaining a trained local model during each iterative operation.

The central node device 110 and the one or more edge node devices 120-1, 120-2, . . . , and 120-N may repeatedly perform the above iterative operation until a predetermined condition is satisfied. In some embodiments, the predetermined condition may include, but is not limited to: the number of iterative operations performed reaches a predetermined number, the training accuracy of the global model reaches an accuracy threshold, or the like.

In some embodiments, the central node device 110 and each edge node device 120-*i* each have a TEE. Moreover, the central node device 110 and each edge node device 120-*i* each perform operations related to model training in the TEE region. For example, for each edge node device 120-*i*, the corresponding model 122-*i* and sample data 124-*i* are stored in the TEE region of the edge node device 120-*i*. For the central node device 110, it performs operations related to model training in the TEE region. For example, the central node device 110 may perform the model training method according to embodiments of the present disclosure in the TEE region.

In addition, in some embodiments, the central node device 110 is connected to each edge node device 120-*i* over a secure channel 130-*i*, and the secure channel 130-*i* is a TEE-supported secure channel, thus making it possible to further ensure the security of data of plaintext computation. Although each edge node device 120-*i* is illustrated in FIG. 1 as having a corresponding secure channel with the central node device 110, it can be understood that a secure channel may be shared between the central node device 110 and a plurality of edge node devices, which is not limited in the present disclosure.

In some embodiments, the central node device 110 may communicate, in response to receiving configuration information, with a remote attestation device to attest the TEE of the central node device 110. In some embodiments, the configuration information includes a division manner for training sample data for model training and information about a remote attestation device that performs TEE attestation with the central node device 110. The central node device 110 may establish a secure channel 130-*i* between the central node device 110 and the one or more edge node devices 120-*i* in response to passing the attestation for the TEE. In some embodiments, the one or more edge node devices each have a TEE. The central node device 110 may receive various types of data, including training results, from the corresponding edge node device 120-*i* or send data to the edge node device 120-*i*, over the secure channel 130-*i*.

In some embodiments, during each iterative operation, the edge node device 120-*s* selected for training the model may train the corresponding model 122-*s* according to the division manner, and the training result sent by the edge node device 120-*s* to the central node device 110 corresponds to the division manner.

For example, the division manner may include a horizontal federated learning manner and a vertical federated learning manner. In the case where the division manner includes a horizontal federated learning manner, the training result sent to the central node device 110 by the edge node device 120-*s* that is selected for training the model includes model parameters, for example, weights of the model, obtained from model training for the model 122-*s* in the edge node device 120-*s*. In the case where the division manner includes a vertical federated learning manner, the training result sent to the central node device 110 by the edge node device 120-*s* that is selected for training the model includes an intermediate result obtained from model training for the model 122-*s* in the edge node device 120-*s*. In some embodiments, the intermediate result includes information related to a gradient of the model 122-*s* in the edge node device 120-*s*. The central node device 110 may obtain an updated global model parameter based on the training result from the edge node device 120-*s* in each iterative operation.

Additionally, in some embodiments, the configuration information may also include structure information of the model that is stored in the edge node device 120-*i*. The central node device 110 may send to each edge node device 120-*i* at least the structure information of the model that is included in the configuration information as edge node configuration information. Each edge node device 120-*i* may configure the local model 122-*i* based on the structure information of the model in the edge node configuration information. Moreover, the structures of the models deployed in the edge node devices 120-1, 120-2, . . . , and 120-N correspond to the division manner in the configuration information. Specifically, in the case where the division manner includes the horizontal federated learning manner, the structures of the plurality of models deployed separately in the edge node devices 120-1, 120-2, . . . , and 120-N are the same as each other. In cases where the division manner includes the vertical federated learning manner, the structures of at least some of the plurality of models deployed separately in the edge node devices 120-1, 120-2, . . . , and 120-N may be different.

In some embodiments, the central node device 110 may be various types of computing systems/servers capable of providing computing power, including, but not limited to, a mainframe computer, an edge computing node, a computing device in a cloud environment, etc., and the present disclosure does not limit the specific type of the central node device 110. The edge node device 120-*i* may include, but is not limited to, a personal computer, a server computer, a handheld or laptop device, a mobile device (such as a cell phone, a personal digital assistant (PDA), a media player, or the like), a multi-processor system, a consumer electronics product, a wearable electronic device, a smart home device, and a combination including any of the above systems or devices, and the present disclosure also does not limit the specific types of edge node devices.

The federated learning-based model training method according to embodiments of the present disclosure is independent of the security protocol layer in current standard federated learning implementations, but instead takes full advantage of the data protection mechanism in the TEE, and can perform plaintext computations in a secure environment, thereby enabling the efficiency of model training to be improved while significantly conserving computational resources and reducing the computational load.

Figure 2:
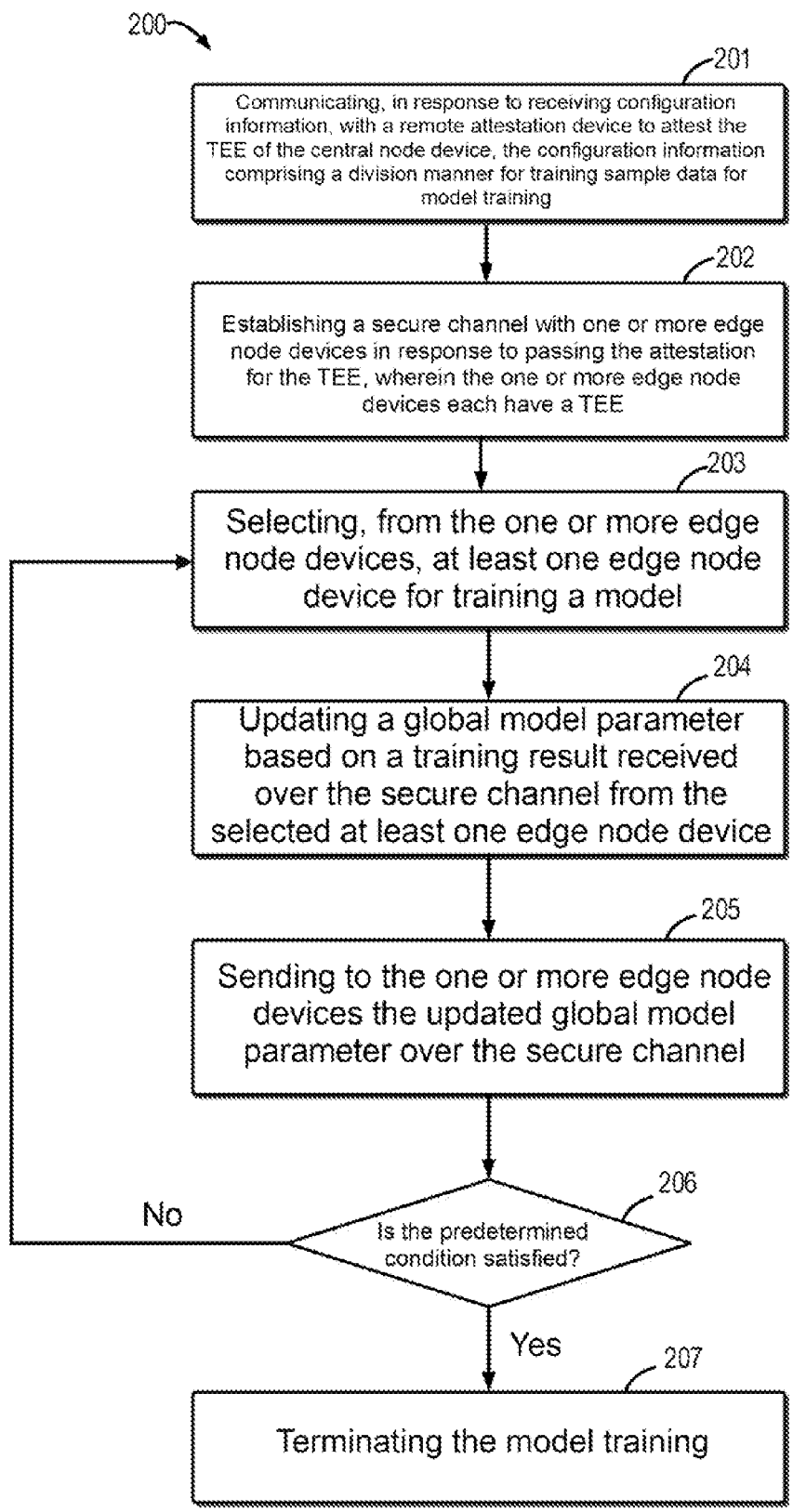
FIG. 2 is a flow chart of a federated learning-based model training method according to an embodiment of the present disclosure.

A block diagram of the example system 100 in which embodiments of the present disclosure can be implemented has been described above with reference to FIG. 1. A federated learning-based model training method according to an embodiment of the present disclosure is described below in conjunction with FIG. 2. FIG. 2 is a flow chart of a federated learning-based model training method 200 according to an embodiment of the present disclosure. The actions involved in the method 200 are described below in conjunction with the example system 100 as shown in FIG. 1. For example, in some embodiments, the method 200 may be executed by the central node device 110. It should be understood that the method 200 may further include additional actions not shown and/or may omit actions shown, and the scope of the present disclosure is not limited in this aspect.

At block 201, the central node device 110 may communicate, in response to receiving configuration information, with a remote attestation device to attest the TEE of the central node device 110. In some embodiments, the configuration information includes a division manner for training sample data for model training.

The central node device 110 may have a TEE. A TEE is a secure region within the hardware that utilizes the characteristics of the hardware to ensure the confidentiality and integrity of the code and data in the TEE region, thereby defending against attacks by untrustworthy software. The model training method according to embodiments of the present disclosure utilizes the security characteristics of the TEE to store data and code related to model training in the TEE region of the central node device 110, thereby enabling computation of the data using plaintext without the need to perform further encryption operations, which can thus conserve computational resources and reduce the computational load.

The configuration information may include information related to model training that is inputted by a user. In some embodiments, the configuration information may include, but is not limited to, one or more of the following: the number of edge node devices participating in model training; device addresses of the edge node devices participating in the model training; information about a remote attestation device (e.g., the address of the remote attestation device) that performs TEE attestation with each edge node device; information about a remote attestation device (e.g., the address of the remote attestation device) that performs TEE attestation with the central node device; a division manner for training sample data for model training; an update method (e.g., a FedAvg method or the like) used by the central node device when updating a global model parameter; and structure information of the model at each edge node device.

In some embodiments, the central node device 110 may communicate, in response to receiving configuration information, with a remote attestation device to attest the TEE of the central node device 110. The attestation process for the TEE may ensure that the code is securely running in the corresponding device. The process of attestation may include, but is not limited to, sending, to the remote attestation device by the central node device 110, attestation information characterizing the TEE state, such as a measurement. The remote attestation device may attest the attestation information to determine whether the TEE can pass the attestation. For example, the remote attestation device may match the received measurement with a reference value, and when it is determined that the measurement matches the reference value, the remote attestation device may determine that the TEE passes the attestation.

In block 202, the central node device 110 may establish a secure channel with one or more edge node devices in response to passing the attestation by the remote attestation device for the TEE. In some embodiments, the one or more edge node devices each have a TEE. In some embodiments, each edge node device 120-$i$ may have a corresponding secure channel with the central node device 110. Alternatively, the central node device 110 may also share a secure channel with a plurality of edge node devices.

In some embodiments, after the central node device 110 determines the passing of the attestation by the remote attestation device for the TEE, the central node device 110 may establish a secure channel 130-$i$ with the edge node device 120-$i$. In some embodiments, the central node device 110 may send edge node configuration information to the edge node device 120-$i$. The central node device 110 may send to the edge node device 120-$i$ some or all of the configuration information received at block 201 as the edge node configuration information. In some embodiments, the edge node configuration information at least includes at least one of the following: information about a remote attestation device (e.g., the address of the remote attestation device) that performs TEE attestation with the corresponding edge node device 120-$i$; a division manner for training sample data for model training; and structure information of the model at the corresponding edge node device 120-$i$. After receiving the edge node configuration information, the edge node device 120-$i$ may communicate, according to the information about the remote attestation device performing the TEE attestation for each edge node device that is included in the edge node configuration information, with the corresponding remote attestation device to perform the TEE attestation. The specific attestation approach may be similar to the implementation of the central node device performing TEE attestation with the remote attestation device described above, which will not be repeated herein for the sake of brevity.

In some embodiments, the remote attestation device for the central node device 110 may be the same as, or different from, the remote attestation device for the edge node device 120-$i$, which is not limited in the present disclosure. In addition, the remote attestation device for the edge node device 120-$i$ may be the same as, or different from, the remote attestation device for the edge node device 120-($i$+1), which is not limited in the present disclosure.

After it determines the passing of the attestation for the TEE of the edge node device 120-$i$, the central node device 110 may send a request to establish a secure channel to the edge node device 120-$i$. The edge node device 120-$i$ may send acknowledgment information to the central node device 110 when it determines that the condition for establishing the secure channel is satisfied. After receiving the acknowledgment information from the edge node device 120-$i$, the central node device 110 establishes a secure channel 130-$i$ with the edge node device 120-$i$.

After establishing a secure channel with the one or more edge node devices participating in the model training, the central node device 110 may iteratively perform the operations as at blocks 203-205 until the predetermined condition at block 206 is satisfied.

In some embodiments, each edge node device 120-$i$ may configure a local model 122-$i$ based on the structure information of the model in the received edge node configuration information. Moreover, the structures of the models deployed in the edge node devices 120-1, 120-2, . . . , and 120-N correspond to the division manner. Specifically, in the case where the division manner includes the horizontal federated learning manner, the structures of the plurality of models deployed separately in the edge node devices 120-1, 120-2, . . . , and 120-N are the same as each other. In cases where the division manner includes the vertical federated learning manner, the structures of at least some of the plurality of models deployed separately in the edge node devices 120-1, 120-2, . . . , and 120-N may be different.

During execution of the iterative operation, at block 203, the central node device 110 may select, from the one or more edge node devices 120-1, 120-2, . . . , and 120-N participating in the model training, at least one edge node device, e.g., 120-$s$ ($1 \le s \le t$; t is the number of edge node devices selected during the current iterative operation for training the model) that is used for model training during the current iterative operation, for use in the current iterative operation to train the corresponding model. Accordingly, the selected edge node device 120-$s$ may utilize the sample data 124-$s$ stored in the local TEE region to train the corresponding model 122-$s$. The selected edge node device 120-$s$ may send to the central node device 110 the training result obtained after the training for the model over the secure channel established with the central node device 110.

In some embodiments, the edge node device 120-$s$ that is selected for training the model may train the corresponding model according to the division manner for the training sample data that is included in the edge node configuration information, and the training result of the training for the model corresponds to the division manner.

In some embodiments, the division manner for the training sample data may include a horizontal federated learning manner and a vertical federated learning manner. In the case where the division manner includes the horizontal federated learning manner, the edge node device 120-$s$ that is selected for training the model may train the model 122-$s$ according to the horizontal federated learning manner based on the locally stored training sample data 124-$s$, and the training result sent to the central node device 110 includes model parameters, for example, weights of the model, obtained from model training for the model 122-$s$. In the case where the division manner includes the horizontal federated learning manner, the model 122-$i$ at each edge node device 120-$i$ of the edge node devices 120-1, 120-2, . . . , and 120-N has the same structure.

In the case where the division manner includes the vertical federated learning manner, the edge node device 120-$s$ that is selected for training the model trains the model 122-$s$ according to the vertical federated learning manner based on the locally stored training sample data 124-$s$. Since the locally stored training sample data 124-$s$ is not complete sample data (e.g., there may be cases where there are no sample labels), the training result sent by the edge node device 120-$s$ to the central node device 110 includes an intermediate result obtained from model training for the model 122-$s$ in the edge node device 120-$s$. In some embodiments, the intermediate result includes information related to a gradient of the model 122-$s$ in the edge node device 120-$s$ that is selected for training the model.

At block 204, the central node device 110 may update a global model parameter based on a training result received over the secure channel from the at least one edge node device that is selected for training the model. In some embodiments, the central node device 110 may process the training result based on an update method (e.g., a FedAvg method or the like) included in the configuration information that is used in updating the global model parameter, so as to update the global model parameter.

At block 205, the central node device 110 may send the updated global model parameter to each edge node device 120-$i$ of the edge node devices 120-1, 120-2, . . . , and 120-N. Each edge node device 120-$i$ may update the local model based on the received global model parameter, thereby obtaining a trained local model during the current iterative operation.

At block 206, the central node device 110 determines whether a predetermined condition is satisfied. In some embodiments, the predetermined condition may include, but is not limited to: the number of iterative operations performed reaches a predetermined number, the training accuracy of the global model reaches an accuracy threshold, or the like. When it is determined that the predetermined condition is satisfied, the central node device 110 terminates the model training, as shown in block 207. When it is determined that the predetermined condition has not been satisfied, the central node device 110 returns to block 203 and continues to perform the operations in blocks 203 to 205 until the predetermined condition is satisfied. The specific execution process for blocks 203 to 205 can be understood with reference to the description above, and will not be repeated herein for the sake of brevity.

In some embodiments, the model 122-$i$ and the training sample data 124-$i$ for each edge node device 120-$i$ of the edge node devices 120-1, 120-2, . . . , and 120-N are stored in the TEE region of the edge node device 120-$i$. Moreover, the central node device 110 performs processing of the training result in the TEE region, as will be described in detail below.

The federated learning-based model training method according to embodiments of the present disclosure, by performing model training in the TEE region and transmitting data in a TEE-supported secure channel, can thereby be independent of the security protocol layer in current standard federated learning implementations and take full advantage of the data protection mechanism in the TEE and can perform plaintext computations in a secure environment, thereby enabling the efficiency of model training to be improved while significantly conserving computational resources and reducing the computational load.

Figure 3:
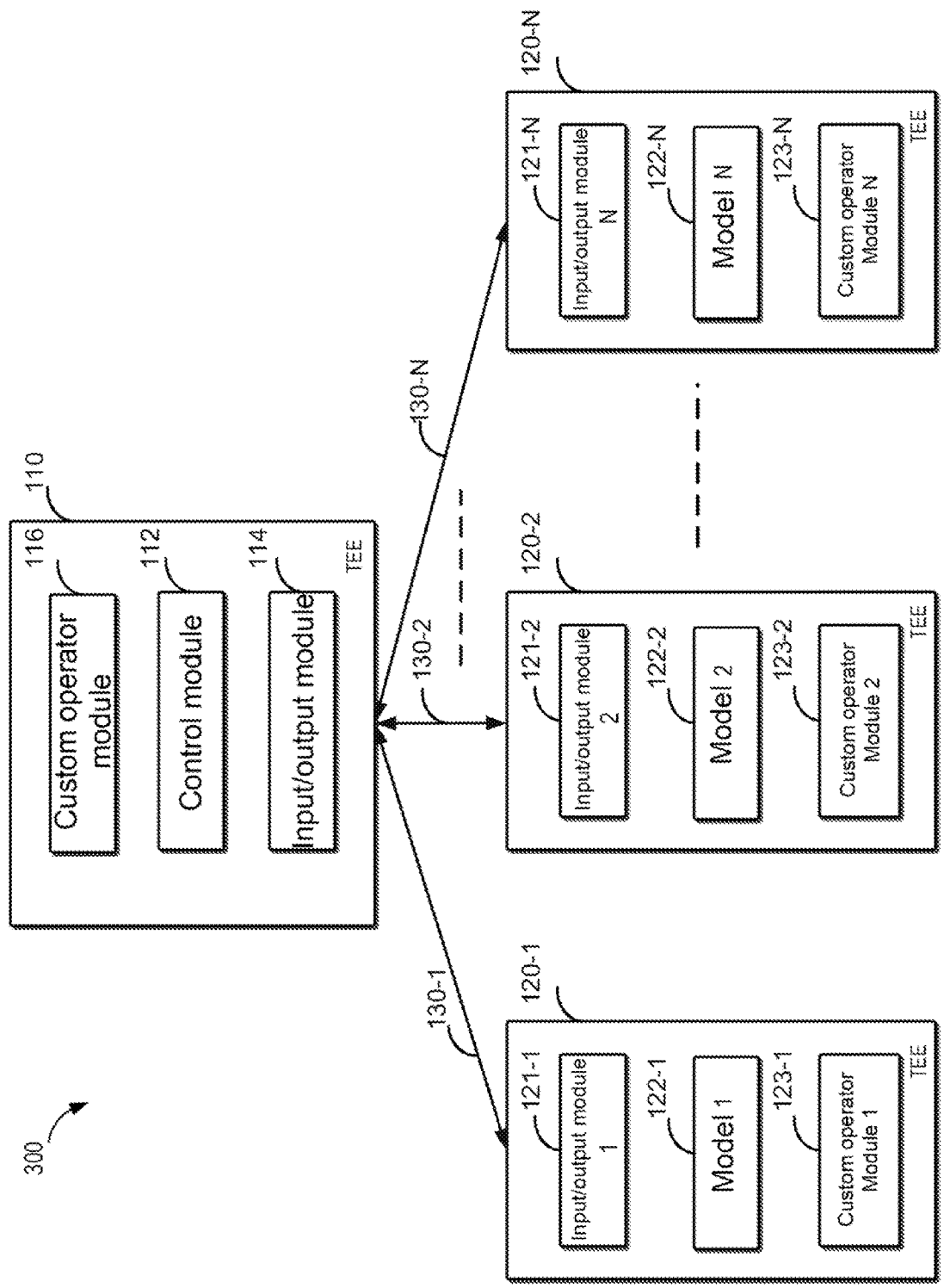
FIG. 3 is a block diagram of a federated learning-based model training system according to an embodiment of the present disclosure.

A federated learning-based model training system 300 according to an embodiment of the present disclosure is described below in conjunction with FIG. 3. FIG. 3 is a block diagram of a federated learning-based model training system according to an embodiment of the present disclosure, including a more detailed view of each of the node devices in FIG. 1. The elements in FIG. 3 that correspond to respective elements in FIG. 1 are indicated by the same reference numerals. As illustrated in FIG. 3, the central node device 110 includes a control module 112, an input/output module 114, and a custom operator module 116. In some embodiments, the control module 112, the input/output module 114, and the custom operator module 116 are all stored in the TEE region of the central node device 110.

In FIG. 3, each edge node device 120-$i$ ($1 \le i \le N$; N is a positive integer greater than or equal to 1) participating in model training includes an input/output module 121-$i$, a model 122-$i$, and a custom operator module 123-$i$. It should be understood that, although not shown in FIG. 3, there is also stored in each edge node device 120-$i$ (e.g., in the TEE region of the edge node device 120-$i$) the sample data 124-$i$ used to train the corresponding model 122-$i$ (as illustrated in FIG. 1). The input/output module 121-$i$, the model 122-$i$, and the custom operator module 123-$i$ are also stored in the TEE region of the edge node device 120-$i$.

In some embodiments, the control module 112 in the central node device 110 is used to control the overall operation flow of model training. After receiving the configuration information input by the user, the control module 112 analyzes and extracts the configuration information and sends the extracted configuration information to the input/output module 114 in the central node device 110. The control module 112 is also used to process, according to the parameter update method in the received configuration information, the training result received from the edge node device 120-i to obtain the updated global model parameter.

In some embodiments, the configuration information may include, but is not limited to, one or more of the following: the number of edge node devices participating in model training; device addresses of the edge node devices participating in the model training; information about a remote attestation device (e.g., the address of the remote attestation device) that performs TEE attestation with each edge node device; information about a remote attestation device (e.g., the address of the remote attestation device) that performs TEE attestation with the central node device; a division manner for training sample data for model training; an update method (e.g., a FedAvg method or the like) used by the central node device when updating a global model parameter; and structure information of the model at each edge node device.

In some embodiments, the input/output module 114 in the central node device 110 receives from the control module 112 the extracted configuration information, and in response to receiving the configuration information, the input/output module 114 may, based on the information about the remote attestation device that performs TEE attestation with the central node device 110 that is included in the configuration information, communicate with the remote attestation device so as to attest TEE of the central node device 110. The description above may be referred to for the specific attestation process and will not be repeated herein.

When the input/output module 114 determines the pass of the attestation for the TEE of the central node device 110, it may send edge node configuration information to each edge node device 120-i based on the device addresses of the edge node devices participating in the model training that is included in the configuration information. Specifically, the input/output module 114 may send the edge node configuration information to the input/output module 121-i of each edge node device 120-i. The edge node configuration information sent to each edge node device 120-i may include all or at least part of the configuration information received by the input/output module 114 from the control module 112. The edge node configuration information sent to the input/output module 121-i of each edge node device 120-i includes at least at least one of the following: information about a remote attestation device (e.g., the address of the remote attestation device) that performs TEE attestation with the corresponding edge node device 120-i; a division manner for training sample data for model training; and structure information of the model at the corresponding edge node device 120-i.

Since the edge node configuration information may include the information about the remote attestation device that performs TEE attestation with the corresponding edge node device, after receiving the edge node configuration information, the input/output module 121-i of each edge node device 120-i may, based on the information about the remote attestation device attesting its TEE that is included in the edge node configuration information, communicate with the corresponding remote attestation device to realize the attestation of the TEE. After determining the pass of the attestation of its TEE, the input/output module 121-i of the edge node device 120-i that has passed the TEE attestation may send notification information of the pass of the attestation to the central node device 110 to establish a secure channel between the central node device 110 and the edge node device that has passed the TEE attestation.

During the process of establishing the secure channel, the central node device 110 (e.g., the input/output module 114 of the central node device 110) may send a request to establish the secure channel to each edge node device 120-i (e.g., the input/output module 121-i) that has passed the TEE attestation. The edge node device 120-i that receives the request to establish a secure channel may send acknowledgment information to the central node device 110 via the input/output module 121-i when it determines that the condition for establishing a secure channel is satisfied. The central node device 110 establishes a secure channel 130-i between the central node device 110 and the corresponding edge node device 120-i in response to the acknowledgment information. This secure channel 130-i is used for data transmission between the central node device 110 and the edge node device 120-i. For example, the training result obtained after the edge node device 120-i has trained the model 122-i may be transmitted via the secure channel 130-i so as to be sent to the central node device 110.

With continued reference to FIG. 3, the central node device 110 in FIG. 3 also includes a custom operator module 116. In some embodiments, the custom operator module 116 creates, based on operators of neural network models, an operator for the neural network model of the central node device 110, and stores the created operator in the TEE region of the central node device 110. In some embodiments, based on the operator of the neural network model, the custom operator module 116 may modify the syntax of the operator to a TEE-supported syntax, for example, from the C language to a TEE-supported syntax, without changing the functionality of the operator. The custom operator module 116 stores the created operator in the TEE region of the central node device 110 for invocation by the control module 112 during the process of processing the training result to update the parameters. In some embodiments, in the case where the division manner for the training sample data in the configuration information indicates the longitudinal federated learning manner, the central node device 110 may invoke the created operator to process the training result so as to obtain the parameters of the global model.

Similarly, as shown in FIG. 3, each edge node device 120-i has a corresponding custom operator module 123-i. The custom operator module 123-i creates, based on operators of the corresponding model 122-i, which is illustratively a neural network model, an operator for the model 122-i of the edge node device 120-i and stores the created operator in the TEE region of the edge node device 120-i. The edge node device 120-i may invoke the operator created by this custom operator module 123-i during training of its model 122-i.

Figure 4:
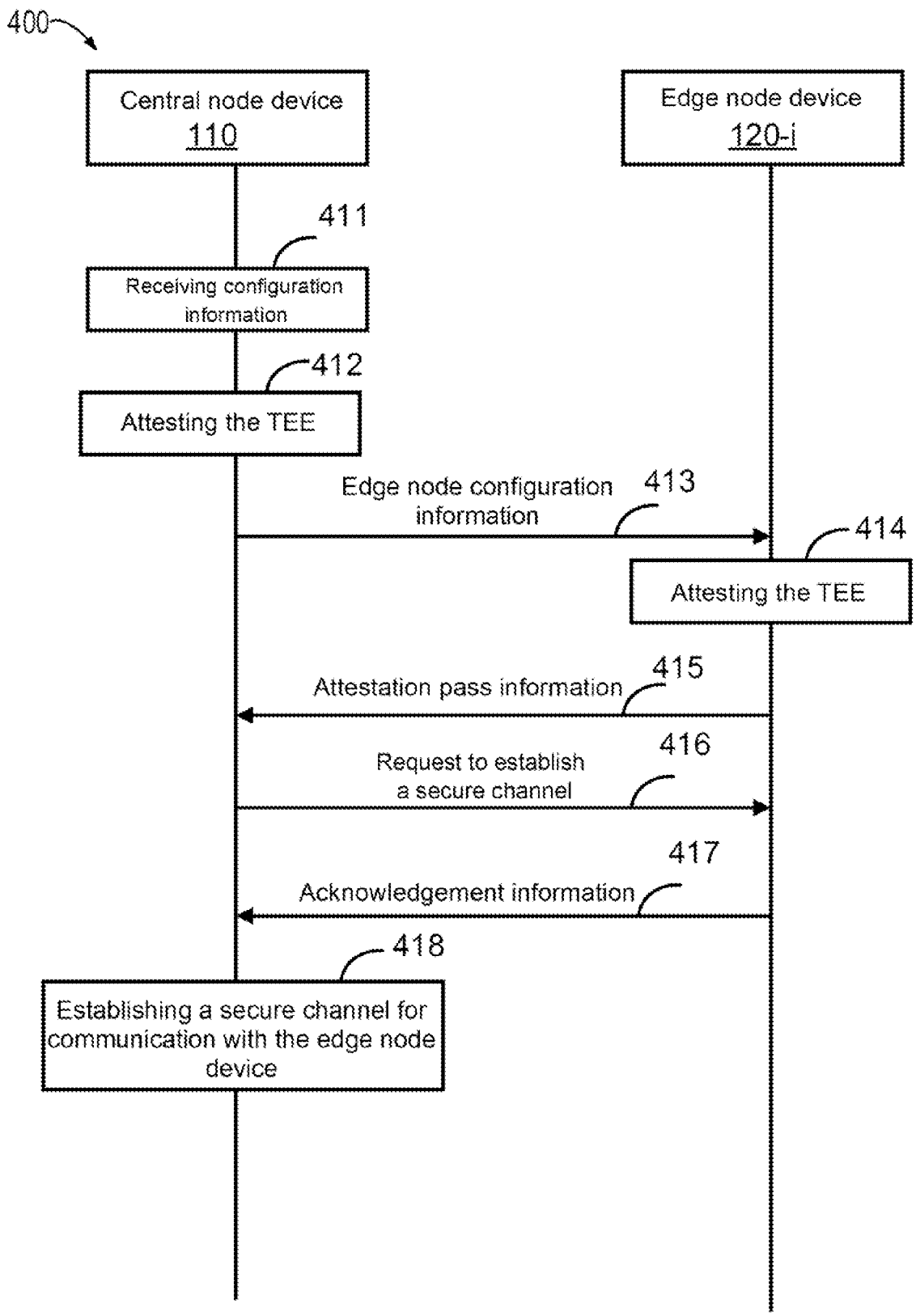
FIG. 4 is a signaling diagram for establishing a secure channel between a central node device and an edge node device according to an embodiment of the present disclosure.

A block diagram of a system for model training according to embodiments of the present disclosure is described above in conjunction with FIG. 3. FIG. 4 is a signaling diagram 400 for establishing a secure channel between a central node device 110 and an edge node device 120-1 according to an embodiment of the present disclosure. The order of the steps in FIG. 4 is not strictly defined, and it can be understood by a person skilled in the art that some of the steps in FIG. 4 can be skipped, reordered, or changed in order.

The central node device 110, as shown in block 411, may receive configuration information inputted by the user, and the configuration information may include, but is not limited to, one or more of the following: the number of edge node devices participating in model training; device addresses of the edge node devices participating in the model training;

information about a remote attestation device (e.g., the address of the remote attestation device) that performs TEE attestation with each edge node device; information about a remote attestation device (e.g., the address of the remote attestation device) that performs TEE attestation with the central node device; a division manner for training sample data for model training; an update method (e.g., a FedAvg method or the like) used by the central node device when updating a global model parameter; and structure information of the model at each edge node device.

In response to receiving the configuration information, the central node device 110 (e.g., the input/output module 114 in FIG. 3) may communicate with the remote attestation device for attesting the TEE, which is indicated in the configuration information, so as to attest the TEE in the central node device 110, as shown in block 412.

After determining the pass of the attestation of the TEE, the central node device 110 (e.g., the input/output module 114 in FIG. 3) may send at 413 all or at least part of the configuration information as edge node configuration information to each edge node device 120-*i* of the plurality of edge node devices participating in the model training. For example, the input/output module 121-*i* of each edge node device 120-*i* may receive the edge node configuration information from the central node device 110, the edge node configuration information including at least one or more of the following: information about a remote attestation device (e.g., the address of the remote attestation device) that attests the TEE of the corresponding edge node device, a division manner for training sample data for model training, and structure information of the model at the corresponding edge node device 120-*i*.

In response to receiving the edge node configuration information, the edge node device 120-*i* may attest the TEE in the edge node device 120-*i* by communicating with the remote attestation device indicated in the edge node configuration information, as shown in block 414.

After determining the pass of the attestation for the TEE, the edge node device 120-*i* may send the information about the pass of the attestation to the central node device 110 at 415. For example, the input/output module 114 in the central node device 110 may receive this attestation pass information, so as to subsequently establish a secure channel with the edge node device 120-*i*.

At 416, the central node device 110 may send a request to establish a secure channel to an edge node device that has passed the TEE attestation. The edge node device that has received the request may determine whether the condition for establishing a secure channel is satisfied and, upon determining that the condition for establishing a secure channel is satisfied, send acknowledgment information to the central node device 110 at 417, which indicates an acknowledgment that a secure channel is to be established between the central node device 110 and the edge node device.

In response to receiving the acknowledgment information from the edge node device, the central node device 110 establishes a secure channel 130-*i* for communication with that edge node device, as shown in block 418. In some embodiments, this secure channel is a TEE-supported secure channel 130-*i* for data communication between the central node device 110 and the edge node device.

In some embodiments, the central node device 110 may establish a separate secure channel with each edge node device 120-*i*. Alternatively, the central node device 110 may share a secure channel with a plurality of edge node devices, which is not limited in the present disclosure.

After establishing a secure channel with each edge node device 120-*i* of the edge node devices 120-1, 120-2, ..., and 120-N, the central node device 110 may perform the training process for the global model together with the edge node devices 120-1, 120-2, ..., and 120-N participating in the model training. In some embodiments, the central node device 110 may iteratively perform the steps in blocks 203 to 205 as in the method 200 in FIG. 2 until the predetermined condition in block 206 is satisfied. The description above in conjunction with FIG. 2 may be referred to for the specific iterative operation process, and will not be repeated herein for the sake of brevity.

A signaling diagram for establishing a secure channel between a central node device and an edge node device according to an embodiment of the present disclosure is described above in conjunction with FIG. 4. A schematic diagram of the workflow of the model training system according to the division manner for training sample data in the configuration information will be described below in conjunction with FIGS. 5 and 6.

Figure 5:
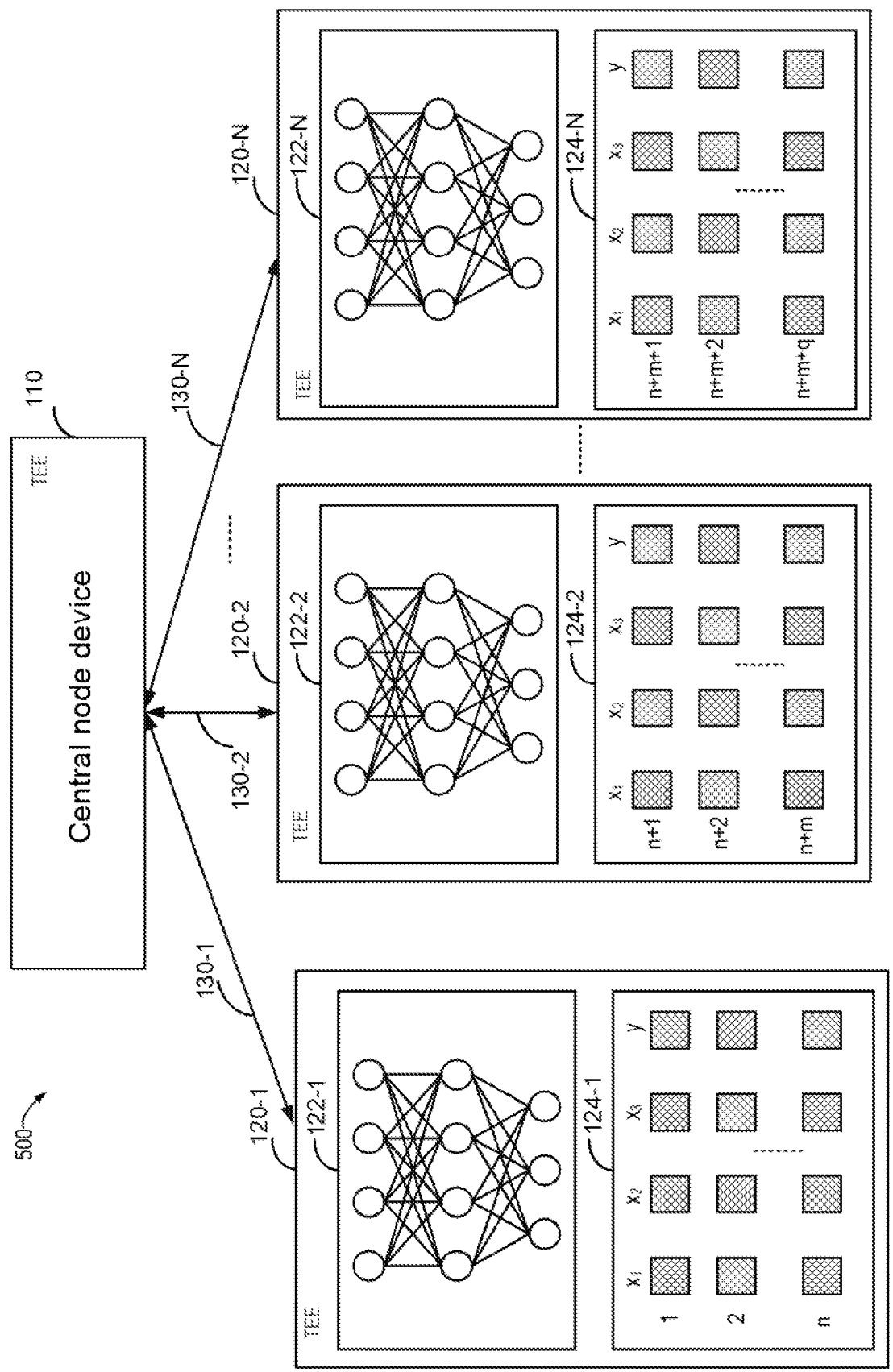
FIG. 5 is a schematic diagram of a workflow of the model training system when the division manner includes a horizontal federated learning manner according to an embodiment of the present disclosure.

FIG. 5 is a schematic diagram 500 of a workflow of the model training system when the division manner includes a horizontal federated learning manner according to an embodiment of the present disclosure. As shown in FIG. 5, when the division manner for training sample data in the configuration information includes the horizontal federated learning manner, the sample data included in each edge node device participating in the model training is complete, that is, the training sample data included in each edge node device includes a feature x and a label y of the sample. As shown in FIG. 5, the edge node device 120-1 includes training sample data D1, D2, ..., and Dn, and Dj ($1 \leq j \leq n$) includes a feature x and a corresponding label y. The edge node device 120-2 includes training sample data D (n+1), D (n+2), ..., and D (n+m), and Dk ($(n+1) \leq k \leq (n+m)$) includes a feature x and a corresponding label y. The edge node device 120-N includes training sample data D (n+m+1), D (n+m+2), ..., and D (n+m+q), and Du ($(n+m+1) \leq u \leq (n+m+q)$) includes a feature x and a corresponding label y. It can be understood that although FIG. 5 shows that each piece of sample data includes three features $x_1$, $x_2$, and $x_3$, this is only an example, and the training sample data included in each edge node device may include any number of features.

The edge node device 120-*i* can configure the model 122-*i* stored in the local TEE region based on the structure information of the model that is included in the edge node configuration information received from the central node device 110. In some embodiments, when the division manner includes the horizontal federated learning manner, the models in the edge node devices have the same structure, and the sample data used for training the model in each edge node device has the same dimensions.

In some embodiments, during the model training, after establishing a secure channel between the central node device 110 and the edge node devices 120-1, 120-2, ..., and 120-N participating in the model training, the central node device 110 may perform the iterative operation described below with the edge node devices 120-1, 120-2, ..., and 120-N to implement training of the global model.

Specifically, in each iterative operation, the central node device 110 may select, from the edge node devices 120-1, 120-2, ..., and 120-N, at least one edge node device 120-*s* ($1 \leq s \leq t$; t is the number of edge node devices selected for training the model in this iterative operation) for training the model, so as to be used for training the locally stored model 122-*s*. The edge node device 120-*s* that is selected for training the model may train the local model in a variety of appropriate manners by utilizing the training sample data stored in the local TEE region and invoking the operator in the custom operator module 123-s. The selected edge node device 120-s may take the model parameters (e.g., weights of the model) obtained from the training as the training result and send them by the input/output module 121-s to the central node device 110 via the secure channel 130-s.

In addition, the central node device 110 (e.g., the input/output module 114 of the central node device 110) receives, over the secure channel 130-s, a model parameter $w_s$ from the edge node device 120-s, the model parameter $w_s$ characterizing a parameter of a model in the corresponding edge node device. The central node device 110 (e.g., the control module 112 of the central node device 110) processes the received model parameters $w_1, w_2, \ldots,$ and $w_t$ (t is the number of edge node devices selected in this iterative operation) according to the update method (e.g., a FedAvg method or the like) that is specified in the configuration information for use in updating the global model parameter, so as to obtain the updated global model parameter W during this iterative operation and send this updated global model parameter W to each edge node device 120-i participating in the model training among the edge node devices 120-1, 120-2, . . . , and 120-N participating in the model training. The edge node device 120-i updates the model stored in the local TEE region based on the updated global model parameter W, thereby obtaining an updated model for each edge node device during this iterative operation.

It can be understood that the above process can be executed iteratively until that training process conforms to the predetermined condition (e.g., the number of iterations is reached, the training accuracy of the global model reaches an accuracy threshold, or the like) and is terminated.

In some embodiments, the central node device 110 may perform a method for model training according to an embodiment of the present disclosure in a TEE region. Moreover, the edge node device 120-i stores both the corresponding model and training sample data in the local TEE region, so as to execute the method for model training according to an embodiment of the present disclosure in the TEE region. In addition, the data transmission between the central node device 110 and the edge node device 120-i is performed via a TEE-supported secure channel, and thus, it can be independent of the security protocol layer in current standard federated learning implementations, but instead takes full advantage of the data protection mechanism in the TEE, and can perform plaintext computations in a secure environment, thereby enabling the efficiency of model training to be improved while significantly conserving computational resources and reducing the computational load.

Figure 6:
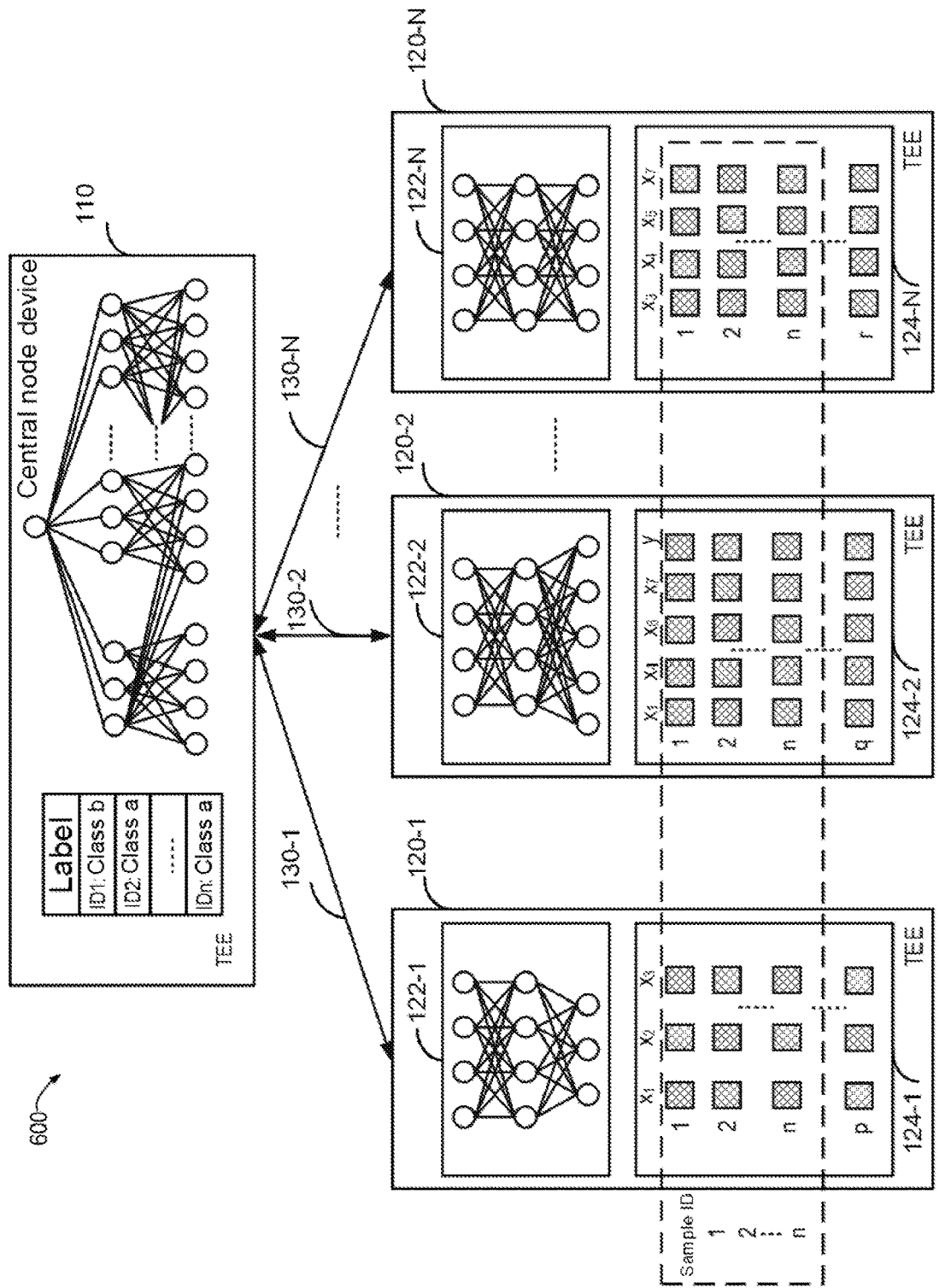
FIG. 6 is a schematic diagram of a workflow of the model training system when the division manner includes a vertical federated learning manner according to an embodiment of the present disclosure.

FIG. 6 is a schematic diagram 600 of a workflow of the model training system when the division manner includes a vertical federated learning manner according to an embodiment of the present disclosure. As shown in FIG. 6, when the division manner for training sample data in the configuration information includes the vertical federated learning manner, the sample data included in each edge node device participating in the model training is not complete, that is, the training sample data included in each edge node device does not necessarily include a feature x and a label y of the sample. For example, one or more of the edge node devices may include some of the features and not include labels. As another example, one or more of the edge node devices may include labels but include only some of the features.

As shown in FIG. 6, the training sample data included in the edge node device 120-1 includes features $x_1$, $x_2$, and $x_3$, and does not include the label y of the data. The training sample data included in the edge node device 120-2 includes features $x_1$, $x_4$, $x_6$, and $x_7$, and the label y. The training sample data included in the edge node device 120-N includes features $x_3$, $x_4$, $x_5$, and $x_7$, but does not include the label y of the data. It can be understood that the examples of training sample data in FIG. 6 are illustrative only and do not constitute a limitation of the present disclosure.

In some embodiments, the edge node device 120-i can configure the model 122-i stored in the local TEE region based on the structure information of the model that is included in the edge node configuration information received from the central node device 110. In some embodiments, when the division manner includes the vertical federated learning manner, the models in the edge node devices may have different structures, as illustrated in FIG. 6, since the training sample data may have different dimensions.

In some embodiments, during the model training, after establishing a secure channel between the central node device 110 and the edge node devices 120-1, 120-2, . . . , and 120-N participating in the model training, the central node device 110 may perform the iterative operation described below with the edge node devices 120-1, 120-2, . . . , and 120-N to implement training of the global model.

Specifically, in each iterative operation, the central node device 110 selects, from the edge node devices 120-1, 120-2, . . . , and 120-N, at least one edge node device 120-s (1≤s≤t; t is the number of edge node devices selected for training the model in this iterative operation) for training the model, so as to be used for training the locally stored model 122-s. In some embodiments, during each iterative operation, the central node device 110 may send an alignment request to each edge node device 120-s participating in this iterative operation to determine training sample data with a common sequence number among the edge node devices selected for training the model. Correspondingly, the determined training sample data with the common sequence number are aligned in the edge node devices selected for training the model. As shown in FIG. 6, in response to receiving the alignment request from the central node device 110, an alignment operation of the training sample data with the common sequence number is performed between the edge node devices selected for performing the model training in this iterative operation, so that the training sample data with the same sequence number can be aligned. For example, as shown in FIG. 6, training sample data with sequence numbers 1, 2 to n are aligned separately. It can be understood that the alignment of training sample data executed by the edge node devices may include logical alignment.

During each iterative operation, the edge node device 120-s that is selected for model training may train the corresponding model in a variety of appropriate manners by utilizing the training sample data stored in the local TEE region and invoking the operator in the custom operator module 123-s. Since the training sample data stored in the local TEE region have different dimensions and do not necessarily have labels, the training result obtained by an edge node device training the model is an intermediate result of the training process in the case where the division manner includes the vertical federated learning manner. In some embodiments, the intermediate result includes information related to a gradient of the model 122-s in the edge node device 120-s. In some embodiments, the intermediate result includes an element associated with the sequence number of the training sample data, for example, a gradient-related information element associated with the sequence number of the training sample data. The edge node device 120-s may send the intermediate result to the central node device 110 by the input/output module 121-s via the secure channel 130-s.

In each iterative operation, the central node device 110 (for example, the input/output module 114 of the central node device 110) receives an intermediate result $R_s$ from the edge node device 120-i through the secure channel 130-s, and the intermediate result $R_s$ characterizes gradient related information of the model in the corresponding edge node device. The central node device 110 (e.g., the control module 112 of the central node device 110) processes the received intermediate results $R_1, R_2, \ldots,$ and $R_t$ (t is the number of edge node devices selected in this iterative operation) based on the update method specified in the configuration information for use in updating model parameters (e.g., the FedAvg method or the like) to obtain the updated global model parameter W. In some embodiments, each intermediate result $R_i$ of the intermediate results $R_1, R_2, \ldots,$ and $R_t$ includes an element associated with the sequence number of the training sample data, for example, a gradient-related information element associated with the sequence number of the training sample data. The central node device 110 can acquire the sequence number of each piece of training sample data and the label corresponding to the sample data of that sequence number in advance. As shown in FIG. 6, the central node device 110 can obtain the following information in advance: The label corresponding to the training sample data with sequence number 1 is class b, the label corresponding to the training sample data with sequence number 2 is class a, and so on.

In each iterative operation, the central node device 110 (e.g., the control module 112 of the central node device 110) can invoke the corresponding operator stored in the TEE region of the central node device 110 based on the sequence number and the label of the training sample data and according to the model parameter update manner set in the configuration information, to process the received intermediate results $R_1, R_2, \ldots,$ and $R_t$ to obtain the updated global model parameter W. The central node device 110 can send the updated global model parameter W as a global model parameter to each edge node device 120-i participating in the model training in the edge node devices 120-1, 120-2, ..., and 120-N participating in the model training. The edge node device 120-i updates the model stored in the local TEE region based on the updated global model parameter W, thereby obtaining the updated model for each edge node device during this iterative operation.

It can be understood that the above process can be executed iteratively until that training process conforms to the predetermined condition (e.g., the number of iterations is reached, the training accuracy of the global model reaches an accuracy threshold, or the like) and is terminated.

In some embodiments, the central node device 110 performs a method for model training according to an embodiment of the present disclosure in a TEE region. Moreover, the edge node device 120-i stores both the corresponding model and training sample data in the local TEE region, so as to execute the method for model training according to an embodiment of the present disclosure in the TEE region. In addition, the data transmission between the central node device 110 and the edge node device 120-i is performed via a TEE-supported secure channel, and thus, it can be independent of the security protocol layer in current standard federated learning implementations, but instead takes full advantage of the data protection mechanism in the TEE, and can perform plaintext computations in a secure environment, thereby enabling the efficiency of model training to be improved while significantly conserving computational resources and reducing the computational load.

Figure 7:
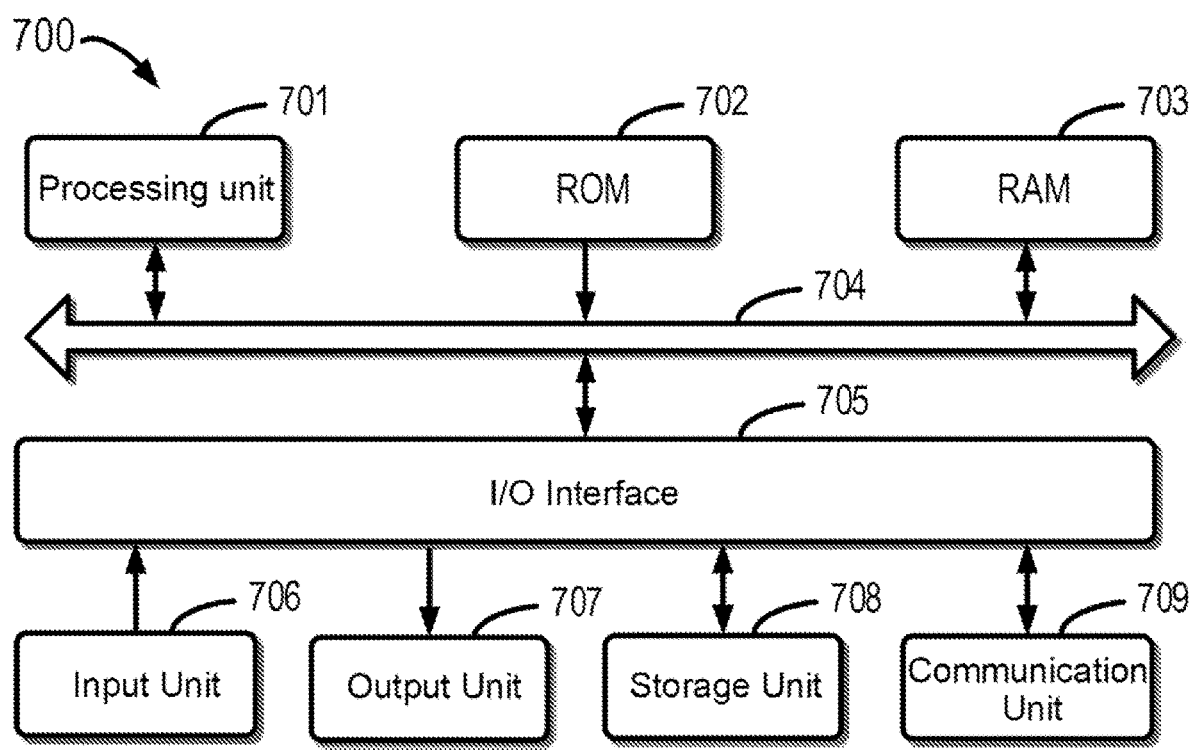
FIG. 7 is a block diagram of a device suitable for implementing example embodiments of the present disclosure.

FIG. 7 is a block diagram of an example device 700 which can be used to implement embodiments of the present disclosure. Both the central node device and/or the edge node devices according to embodiments of the present disclosure can be implemented using the device 700. As shown in the figure, the device 700 includes a processing unit 701, illustratively comprising a central processing unit (CPU), which can perform various appropriate actions and processing according to computer program instructions stored in a read-only memory (ROM) 702 or computer program instructions loaded from a storage unit 708 into a random access memory (RAM) 703. Various programs and data required for the operation of the device 700 may also be stored in the RAM 703. The processing unit 701, the ROM 702, and the RAM 703 are connected to each other through a bus 704. An input/output (I/O) interface 705 is also connected to the bus 704.

A plurality of components in the device 700 are connected to the I/O interface 705, including: an input unit 706, such as a keyboard and a mouse; an output unit 707, such as various types of displays and speakers; the storage unit 708, such as a disk or an optical disk; and a communication unit 709, such as a network card, a modem, and a wireless communication transceiver. The communication unit 709 allows the device 700 to exchange information/data with other devices via a computer network, such as the Internet, and/or various telecommunication networks.

The various processes and processing described above, such as the method 200, may be performed by the processing unit 701. For example, in some embodiments, the method 200 may be implemented as a computer software program that is tangibly included in a machine-readable medium such as the storage unit 708. In some embodiments, part or all of the computer program may be loaded and/or installed onto the device 700 via the ROM 702 and/or the communication unit 709. When the computer program is loaded into the RAM 703 and executed by the processing unit 701, one or more actions of the method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on the involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technological improvements, so as to enable persons of ordinary skill in the art to understand the embodiments disclosed herein.

What is claimed is:

1. A federated learning-based model training method, which is executed by a central node device having a hardware-based Trusted Execution Environment (TEE), the method comprising:
   communicating, in response to receiving configuration information, with a remote attestation device to attest the hardware-based TEE of the central node device, the configuration information comprising a division manner for training sample data for model training;
   establishing a secure channel with one or more edge node devices in response to passing the attestation for the hardware-based TEE, wherein the one or more edge node devices each have a hardware-based TEE; and
   performing the following operations iteratively until a predetermined condition is satisfied:
   selecting, from the one or more edge node devices, at least one edge node device for training a model;

controlling deployment of at least a portion of the model in the at least one edge node device;
initiating training of the model in the at least one edge node device to produce a training result;
receiving the training result from the selected at least one edge node device over the secure channel;
updating a global model parameter based on the training result received over the secure channel from the selected at least one edge node device, wherein the selected at least one edge node device trains corresponding models separately according to the division manner, and the training result corresponds to the division manner; and
sending, to the one or more edge node devices, the updated global model parameter over the secure channel.

2. The method according to claim 1, wherein establishing a secure channel with the one or more edge node devices comprises:
sending edge node configuration information to the one or more edge node devices, the edge node configuration information comprising information about a remote attestation device that performs TEE attestation with the one or more edge node devices;
sending, in response to the one or more edge node devices each passing the TEE attestation, to the one or more edge node devices, a request to establish a secure channel; and
establishing the secure channel between the central node device and the one or more edge node devices in response to an acknowledgment from the one or more edge node devices.

3. The method according to claim 1, wherein the configuration information further comprises structure information of a model for training that corresponds to the division manner and is deployed in each of the one or more edge node devices.

4. The method according to claim 1, wherein in response to the division manner comprising a horizontal federated learning manner, the training result comprises model parameters obtained from model training for a model in each of the selected at least one edge node device.

5. The method according to claim 4, further comprising:
processing the obtained model parameters according to a model parameter update manner in the configuration information to obtain the updated global model parameter; and
sending the updated global model parameter to each of the one or more edge node devices via the secure channel.

6. The method according to claim 1, wherein in response to the division manner comprising a vertical federated learning manner, the training result comprises an intermediate result of model training for a model in each of the selected at least one edge node device.

7. The method according to claim 6, wherein the intermediate result comprises an element associated with a sequence number of the training sample data.

8. The method according to claim 6, further comprising:
constructing an operator used during the model training; and
storing the constructed operator in the hardware-based TEE of the central node device.

9. The method according to claim 7, further comprising:
invoking a corresponding operator stored in the hardware-based TEE based on the sequence number and a label of the training sample data and according to a model parameter update approach in the configuration information to process the intermediate result to obtain the updated global model parameter; and
sending the updated global model parameter to each of the one or more edge node devices via the secure channel.

10. The method according to claim 1, wherein a model corresponding to each of the one or more edge node devices is stored in the hardware-based TEE of the corresponding edge node device.

11. A central node device having a hardware-based Trusted Execution Environment (TEE), the central node device comprising:
at least one processor, and
memory coupled to the at least one processor and having instructions stored therein, wherein the instructions, when executed by the at least one processor, cause the central node device to perform actions comprising:
communicating, in response to receiving configuration information, with a remote attestation device to attest the hardware-based TEE of the central node device, the configuration information comprising a division manner for training sample data for model training;
establishing a secure channel with one or more edge node devices in response to passing the attestation for the hardware-based TEE, wherein the one or more edge node devices each have a hardware-based TEE; and
performing the following operations iteratively until a predetermined condition is satisfied:
selecting, from the one or more edge node devices, at least one edge node device for training a model;
controlling deployment of at least a portion of the model in the at least one edge node device;
initiating training of the model in the at least one edge node device to produce a training result;
receiving the training result from the selected at least one edge node device over the secure channel;
updating a global model parameter based on the training result received over the secure channel from the selected at least one edge node device, wherein the selected at least one edge node device trains corresponding models separately according to the division manner, and the training result corresponds to the division manner; and
sending, to the one or more edge node devices, the updated global model parameter over the secure channel.

12. The central node device according to claim 11, wherein establishing a secure channel with the one or more edge node devices comprises:
sending edge node configuration information to the one or more edge node devices, the edge node configuration information comprising information about a remote attestation device that performs TEE attestation with the one or more edge node devices;
sending, in response to the one or more edge node devices each passing the TEE attestation, to the one or more edge node devices, a request to establish a secure channel; and
establishing the secure channel between the central node device and the one or more edge node devices in response to an acknowledgment from the one or more edge node devices.

13. The central node device according to claim 11, wherein the configuration information further comprises structure information of a model for training that corresponds to the division manner and is deployed in each of the one or more edge node devices.

14. The central node device according to claim 11, wherein in response to the division manner comprising a horizontal federated learning manner, the training result comprises model parameters obtained from model training for a model in each of the selected at least one edge node device.

15. The central node device according to claim 14, wherein the actions further comprise:
    processing the obtained model parameters according to a model parameter update manner in the configuration information to obtain the updated global model parameter; and
    sending the updated global model parameter to each of the one or more edge node devices via the secure channel.

16. The central node device according to claim 11, wherein in response to the division manner comprising a vertical federated learning manner, the training result comprises an intermediate result of model training for a model in each of the selected at least one edge node device.

17. The central node device according to claim 16, wherein the actions further comprise:
    constructing an operator used during the model training; and
    storing the constructed operator in the hardware-based TEE of the central node device.

18. The central node device according to claim 17, wherein the actions further comprise:
    invoking a corresponding operator stored in the hardware-based TEE based on a sequence number and a label of the training sample data and according to a model parameter update approach in the configuration information to process the intermediate result to obtain the updated global model parameter; and
    sending the updated global model parameter to each of the one or more edge node devices via the secure channel.

19. The central node device according to claim 11, wherein a model corresponding to each of the one or more edge node devices is stored in the hardware-based TEE of the corresponding edge node device.

20. A computer program product comprising a non-transitory computer-readable medium having machine-executable instructions stored therein, wherein the machine-executable instructions, when executed by a machine, cause the machine to perform actions comprising:
    communicating, in response to receiving configuration information, with a remote attestation device to attest a hardware-based Trusted Execution Environment (TEE) of a central node device, the configuration information comprising a division manner for training sample data for model training;
    establishing a secure channel with one or more edge node devices in response to passing the attestation for the hardware-based TEE, wherein the one or more edge node devices each have a hardware-based TEE; and
    performing the following operations iteratively until a predetermined condition is satisfied:
    selecting, from the one or more edge node devices, at least one edge node device for training a model;
    controlling deployment of at least a portion of the model in the at least one edge node device;
    initiating training of the model in the at least one edge node device to produce a training result;
    receiving the training result from the selected at least one edge node device over the secure channel;
    updating a global model parameter based on the training result received over the secure channel from the selected at least one edge node device, wherein the selected at least one edge node device trains corresponding models separately according to the division manner, and the training result corresponds to the division manner; and
    sending, to the one or more edge node devices, the updated global model parameter over the secure channel.

\* \* \* \* \*